(12) United States Patent
Shen et al.

(10) Patent No.: US 10,839,069 B2
(45) Date of Patent: Nov. 17, 2020

(54) PROTECTING ARTIFICIAL INTELLIGENCE MODELS USING VIRTUAL SECURE MODE

(71) Applicant: Microsoft Technology Licensing, LLC, Redmond, WA (US)

(72) Inventors: Wenbo Shen, Redmond, WA (US); Bryston Mitsuo Nitta, Redmond, WA (US); Chen Liang, Redmond, WA (US); Adrian Francisco Teran Guajardo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 16/031,715

(22) Filed: Jul. 10, 2018

(65) Prior Publication Data

US 2020/0019697 A1    Jan. 16, 2020

(51) Int. Cl.
| | | |
|---|---|---|
| *G06F 21/53* | (2013.01) | |
| *G06F 9/455* | (2018.01) | |
| *G06F 21/51* | (2013.01) | |
| *G06F 21/62* | (2013.01) | |
| *G06N 3/02* | (2006.01) | |

(52) U.S. Cl.
CPC .......... *G06F 21/53* (2013.01); *G06F 9/45558* (2013.01); *G06F 21/51* (2013.01); *G06F 21/6209* (2013.01); *G06N 3/02* (2013.01); *G06F 2009/45587* (2013.01)

(58) Field of Classification Search
CPC ...... G06F 21/53; G06F 21/6209; G06F 21/51; G06F 21/14; G06F 9/45558; G06F 2009/45587; G06N 3/02
See application file for complete search history.

(56) References Cited

U.S. PATENT DOCUMENTS

| | | |
|---|---|---|
| 2015/0082305 A1 | 3/2015 | Hepkin et al. |
| 2016/0140343 A1 | 5/2016 | Novak et al. |
| 2017/0357910 A1 | 12/2017 | Sommer et al. |
| 2019/0294960 A1* | 9/2019 | Niemi ..................... G06F 21/44 |
| 2019/0296910 A1* | 9/2019 | Cheung ................ G06N 3/0481 |
| 2019/0361697 A1* | 11/2019 | Hu ........................ G06F 9/44521 |
| 2019/0392305 A1* | 12/2019 | Gu ........................ G06N 3/0454 |
| 2020/0007512 A1* | 1/2020 | Kirat ..................... H04L 9/0872 |

OTHER PUBLICATIONS

"Open Neural Network Exchange—ONNX", retrieved from https://github.com/onnx/onnx/blob/master/docs/IR.md on Jun. 8, 2018, 10 pages.

"International Search Report and Written Opinion Issued in PCT Application No. PCT/US19/039398", dated Oct. 7, 2019, 11 Pages.

* cited by examiner

*Primary Examiner* — Nelson S. Giddins
(74) *Attorney, Agent, or Firm* — Rainier Patents, P.S.

(57) ABSTRACT

Described herein is a system and method for utilizing a virtual secure mode instance to protect an artificial intelligence model from unauthorized access (e.g., inspection, copying) during execution of an application utilizing the AI model (e.g., training and/or inference) on a client device. An encrypted artificial intelligence model is received in a virtual secure mode instance of the client device. The encrypted artificial intelligence model is decrypted in the virtual secure mode instance using a decryption secret. The decrypted artificial intelligence model is stored in the virtual secure mode instance. An application that utilizes the decrypted artificial intelligence model is executed (e.g., training and/or inference) in the virtual secure mode instance.

20 Claims, 6 Drawing Sheets

PROTECTING ARTIFICIAL INTELLIGENCE MODELS USING VIRTUAL SECURE MODE

BACKGROUND

Development of artificial intelligence models can involve significant financial investment and/or investment of engineering resources. Further, in order to fully develop an artificial intelligence model, time and resource intensive acquisition of unique domain-specific knowledge is generally performed.

SUMMARY

Described herein is a system for protecting an artificial intelligence model, comprising: a client device comprising a processor and a memory having computer-executable instructions stored thereupon which, when executed by the processor, cause the client device to: receive an encrypted artificial intelligence model in a virtual secure mode instance of the client device; decrypt the encrypted artificial intelligence model in the virtual secure mode instance using a decryption secret; store the decrypted artificial intelligence model in the virtual secure mode instance; and execute an application that utilizes the decrypted artificial intelligence model in the virtual secure mode instance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to protecting an artificial intelligence model using a virtual secure mode instance (e.g., of a client device) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding protecting an artificial intelligence model on a client device. What follows are one or more exemplary systems and methods.

Aspects of the subject disclosure pertain to the technical problem of protecting an artificial intelligence model on a client device. The technical features associated with addressing this problem involve receiving an encrypted artificial intelligence model in a virtual secure mode instance of the client device; decrypting the encrypted artificial intelligence model in the virtual secure mode instance using a decryption secret; storing the decrypted artificial intelligence model in the virtual secure mode instance; and executing an application that utilizes the decrypted artificial intelligence model in the virtual secure mode instance. Accordingly, aspects of these technical features exhibit technical effects of more efficiently and effectively increasing security of artificial intelligence model(s) and/or improving security of executing (e.g., inference and/or training) of artificial intelligence model(s).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

The design and/or training of an artificial intelligence (AI) model generally involves unique domain knowledge and/or significant engineering resources. Thus, a well-designed and/or well-trained AI model can be considered and protected as a proprietary asset of the developer/publisher. Conventionally, AI model(s) have been executed in a secure environment such as a cloud-based service. While user(s) are able to utilize the AI model(s) to infer an output in accordance with a submitted input, the AI model(s) themselves have not been accessible to user(s) for inspection, copying, etc. Providing and/or executing AI model(s) on a client device (e.g., outside of a secure cloud-based environment) can lead to unauthorized access (e.g., inspection, copying) during training and/or inference since the AI model(s) may be visible to a user of a host operating system of the client device.

Described herein is a system and method for utilizing a virtual secure mode (VSM) instance to protect an AI model from unauthorized access (e.g., inspection, copying) during execution of an application utilizing the AI model (e.g., training and/or inference) on a client device. An encrypted AI model is received by the host operating system and decrypted in the VSM instance, where task(s) such as training and/or inference can be securely performed. Since the VSM instance and the host operating system are treated as two separate virtual machines, the host operating system cannot access the decrypted AI model running on the VSM instance. In some embodiments, the VSM instance can leverage a trusted platform module to store and retrieve a secret protecting the AI model, thus gaining both operating system isolation and in-transit/in-use protection of the AI model.

Figure 1:
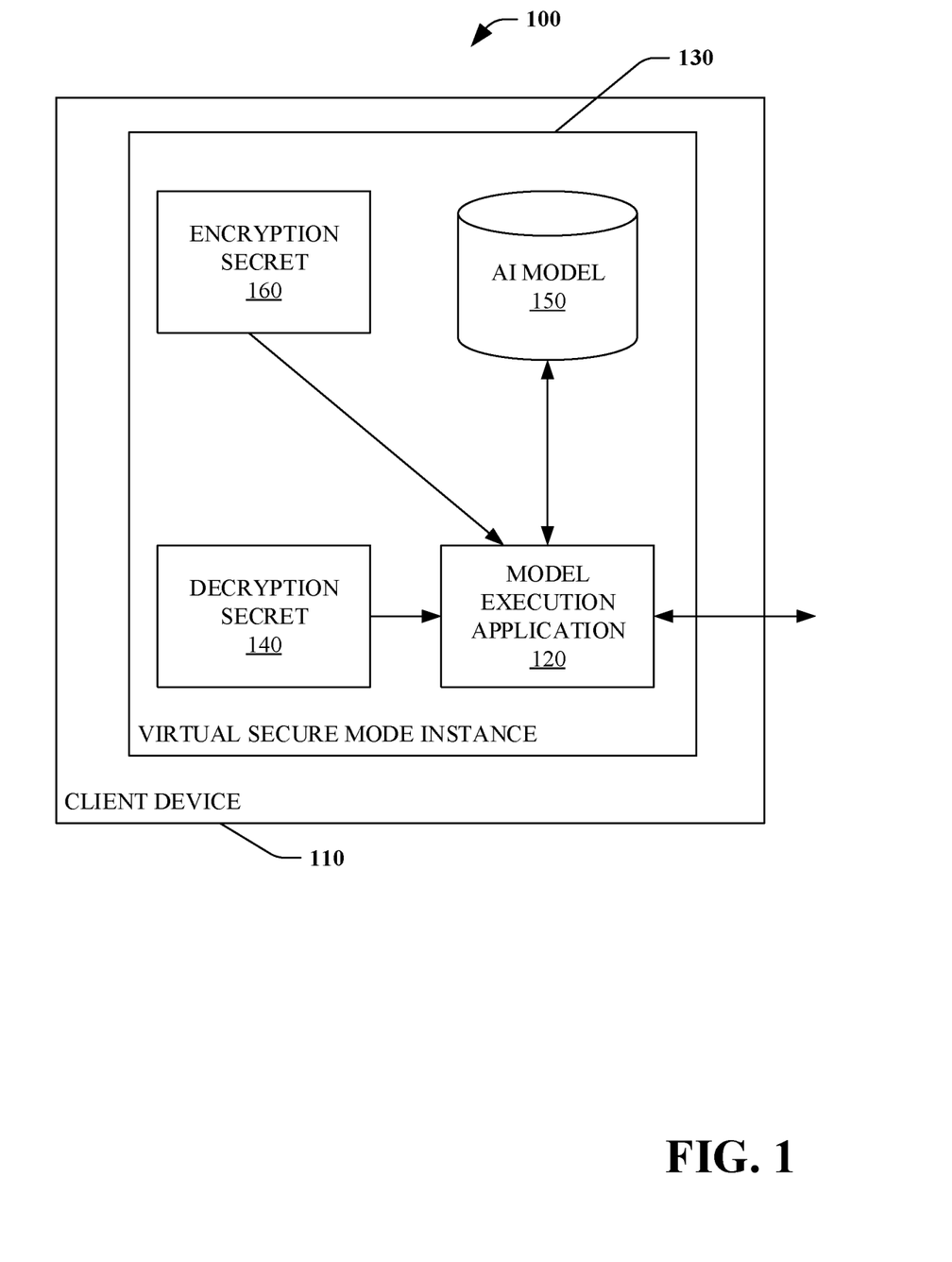
FIG. 1 is a functional block diagram that illustrates a system for protecting an artificial intelligence model on a client device.

Referring to FIG. 1, a system for protecting an artificial intelligence (AI) model on a client device 100 is illustrated. The system 100 can utilize a virtual secure mode (VSM) instance to protect the AI model from unauthorized access (e.g., inspection, copying) during execution of an application utilizing the AI model (e.g., training and/or inference) on a client device 110.

In some embodiments, VSM is a feature that leverages virtualization extension(s) of a CPU to sequester process(es) and their memory against viewing/tampering from other, potentially malicious, entity(ies). VSM thus provides added security of data in memory. Further, "client device" refers to a general-purpose computer, processing system, or computing device (e.g., mobile phone, desktop, laptop, tablet, watch, server, hand-held, programmable consumer or industrial electronics, set-top box, game system, compute node, etc.) which, in its simplest form, has one or more processors coupled to memory that execute various computer executable actions, instructions, and or components stored in memory.

The system 100 includes a model execution application 120 that receives an encrypted AI model in a virtual secure mode (VSM) instance 130 on the client device 110. In some embodiments, as discussed in greater detail with respect to FIG. 2 below, the VSM instance 130 is isolated from a host operating system with memory of the VSM instance 130 independent and hardware-regulated to ensure that the host operating system cannot access the memory of the VSM instance 130. Thus, the VSM instance 130 isolates the AI model 150 and/or utilization of the AI model 150 from a host operating system and/or other VSM instances, thus protecting the AI model in-transit and in-use.

The AI model comprises digital information that encompasses a particular artificial intelligence model, for example, developed for a particular purpose and/or inference scenario. In some embodiments, the AI model is a serialized format of a computation graph in accordance with the Open Neural Network Exchange (ONNX) standard. ONNX is an open specification that includes: (1) a definition of an extensible computation graph model; (2) definitions of standard data types; and (3) definition of built-in operators. A serialized graph comprises a set of metadata fields, a list of model parameters, and a list of computation nodes. The AI model is encrypted, for example, by a developer and/or a publisher to protect information included in the AI model from being disclosed.

The model execution application 120 can decrypt the encrypted AI model using a decryption secret 140 and store the AI model 150 within the VSM instance 130. In some embodiments, the decryption secret 140 is pre-provisioned into the VSM instance 130 by the developer/publisher of the AI model 150. For example, the decryption secret 140 can be stored during activation/initialization of the host operating system of the client device 110. In some embodiments, the decryption secret 140 can be a private key of a public/private key pair. In some embodiments, the decryption secret 140 is a shared key (e.g., symmetric key) known by and kept secret by the VSM instance 130 and the developer/publisher of the AI model 150.

Once decrypted, the AI model 150 can be utilized by the model execution application 120 in the VSM instance 130. In some embodiments, the model execution application 120 can further utilize the decrypted AI model 150 in the VSM instance 130 to infer an output based upon a received input. The model execution application 120 can provide the inferred output, for example, to an application executing on a host operating system of the client device 110, as discussed below. In some embodiments, the model execution application 120 can utilize the decrypted AI model 150 to adapt the AI model 150 in accordance with a received input and a received expected output (e.g., training of the AI model 150).

In some embodiments, the model execution application 120 interprets the AI model 150. In some embodiments, the VSM instance 130 includes a code generator (not shown) that translates the AI model 150 to executable code for a target programming language which is then utilized by the model execution application 120.

In some embodiments, the application 140 adapts the decrypted AI model 150 in accordance with a received input and a received output. The model execution application 120 can encrypt the adapted AI model using an encryption secret 160 and provide the encrypted AI model to the host operating system of the client device 110 (e.g., to be provided to a cloud-based service), as discussed below. In some embodiments, the encryption secret 160 is public key of a public/private key pair, with the private key known to the developer/publisher of the AI mode. In some embodiments, the encryption secret 160 is a shared key (e.g., symmetric key) known by and kept secret by the VSM instance 130 and the developer/publisher of the AI model 150. In some embodiments, the encryption secret 160 and the decryption secret 140 are the same. In some embodiments, the encryption secret 160 and the decryption secret 140 are different.

Figure 2:
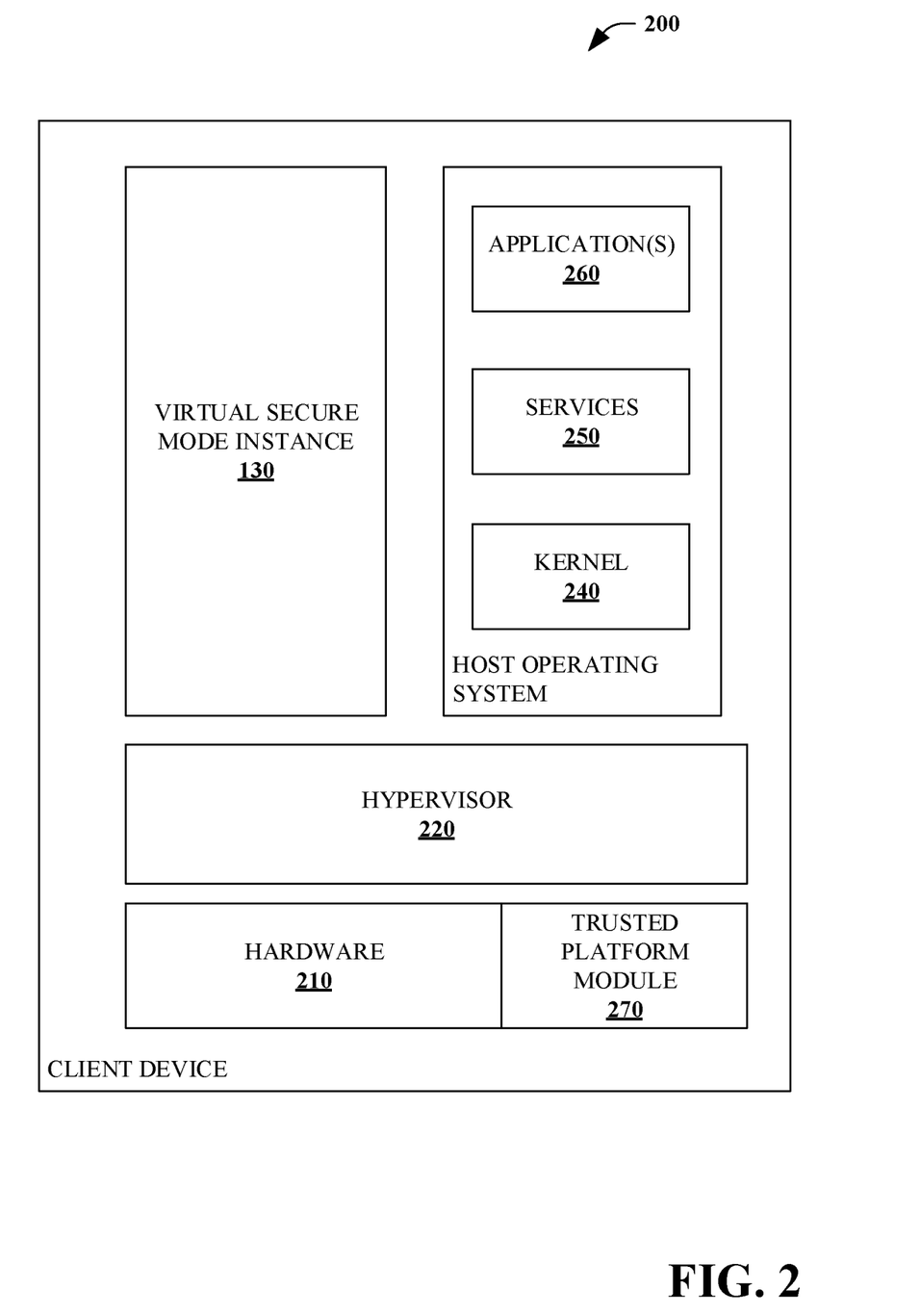
FIG. 2 is a functional block diagram of an exemplary client device.

Turning to FIG. 2, an exemplary client device 200 is illustrated. The client device 200 includes hardware 210 and a hypervisor 220. The client device 200 further includes a host operating system 230 having a kernel 240, service 250, and/or application(s) 260. The client device 200 further includes the VSM instance 130.

The hypervisor 220 is in communication with the hardware 210 and serves to abstract the host operating system 230 and the VSM instance 130 from the underlying hardware 210 itself, providing control and scheduling functions that allow the hardware 210 to be securely shared between the host operating system 230 and the VSM instance 130. During booting of the client device 200, the hypervisor 220 loads and later calls loaders of the host operating system 230 and the VSM instance 130. In this manner, multiple security boundaries are generated. A security boundary refers to a manner of operation of the client device 200, or a portion of the client device 200, where a program executing in one security boundary is prohibited from accessing data or programs in another security boundary. A security boundary, also referred to as a security isolation boundary or an isolation boundary, is a manner of operation of the client device 200 or a portion of the client device 200.

The hypervisor 220 thus establishes and enforces the security boundaries, prohibiting a program executing in one security boundary from accessing data and programs in another security boundary. In some embodiments, an application running in the VSM instance 130 is prohibited from accessing data in and application(s) running in the host operating system 230, and an application 260 running in the host operating system 230 is prohibited from accessing data in and programs running in the VSM instance 130.

In some embodiments, the client device 200 can include an optional secure cryptoprocessor that is a trusted platform module (TPM) 270. The TPM 270 can be a physical device or a virtual device. In some embodiments, the TPM 270 is provided by the hypervisor 220. In some embodiments, the TPM 270 comprises dedicated hardware (e.g., dedicated integrated circuit and/or component part of an integrated circuit) that prevents the host operating system 230 from accessing the virtual secure mode instance 130 and, more specifically, the AI model 150. In some embodiments, the TPM 270 comprises firmware. In some embodiments, the TPM 270 comprises a software emulator.

The TPM 270 includes various functionality, such as key generation, encryption, decryption, secure storage (e.g., platform configuration registers), and so forth. In one or more embodiments, the TPM 270 conforms to the Trusted Computing Group Trusted Platform Module specification version 1.2, published as the ISO/IEC 11889 Information technology—Trusted Platform Module specification, Parts 1-4. Although discussed herein with reference to TPM 270, in some embodiments, the client device 200 can alternatively use one or more other cryptoprocessors that provide functionality similar to the TPM.

Once the host operating system 230 has been loaded, the kernel 240 can provide core functionality including low-level operations such as scheduling threads and/or routing hardware interrupts. The host operating system 230 can further include services 250, for example, memory management, power management, creation and coordination of multiple threads of execution.

In some embodiments, the VSM instance 130 executes securely and independently of the host operating system 230. An encrypted AI model can be received in the VSM instance 130 from the host operating system 230 and decrypted only in the VSM instance 130. Once decrypted in the VSM instance 130, the AI model can be utilized by an application (e.g., model execution application 120) to perform inference based upon a received input and/or training of the AI model in accordance with received input(s) and output(s). Since the VSM instance 130 and the host operating system 230 are treated as two separate virtual machines, the host operating system 230 cannot access the AI model running on the VSM instance 130. Encryption of the AI model facilitates in-transit protection of the AI model. Decryption of the AI model and utilization of the AI model in the VSM instance 130 facilitates in-use protection of the AI model.

Figure 3:
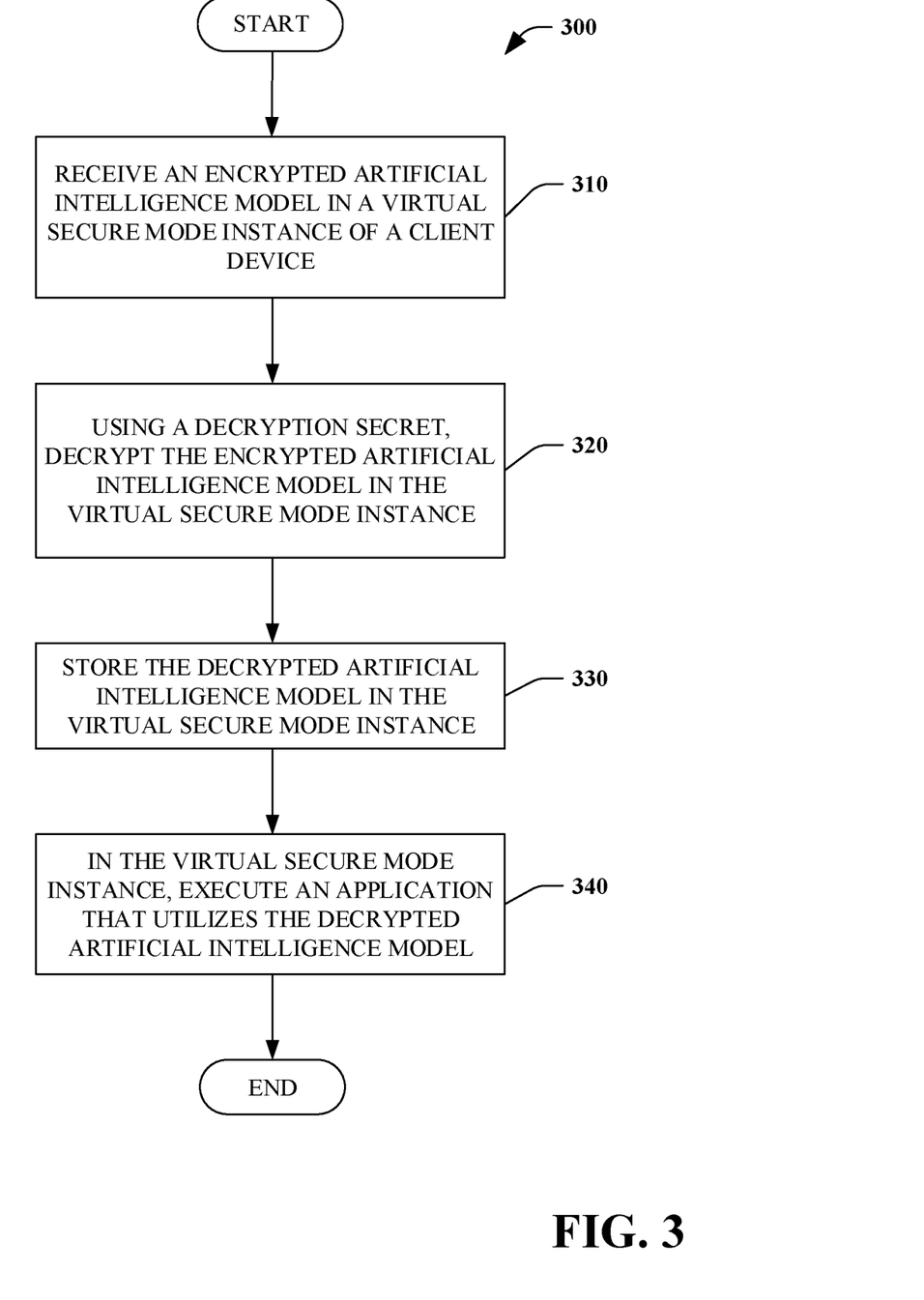
FIG. 3 is a flow chart of a method of protecting an artificial intelligence model on a client device.
Figure 4:
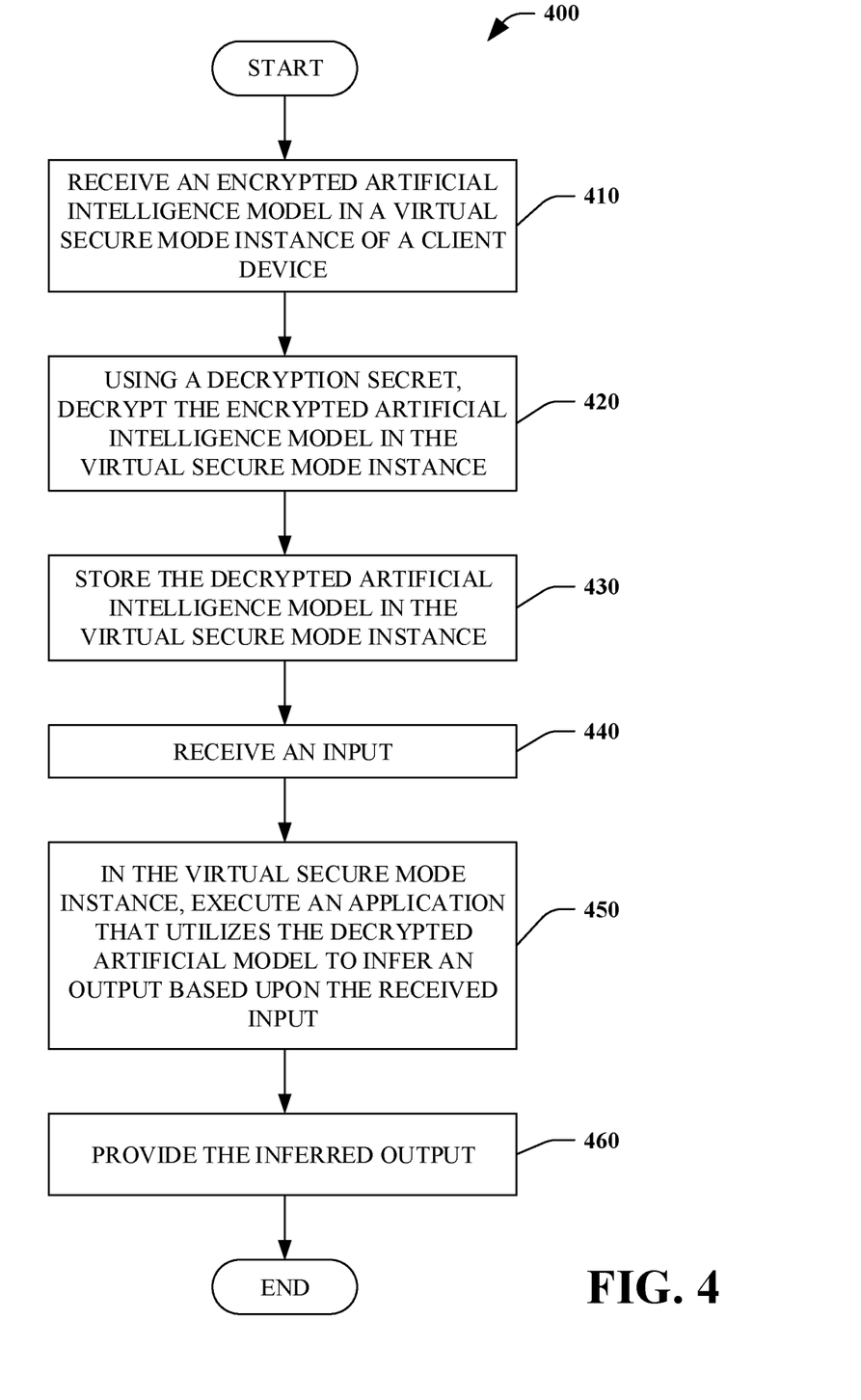
FIG. 4 is a flow chart of another method of protecting an artificial intelligence model on a client device.
Figure 5:
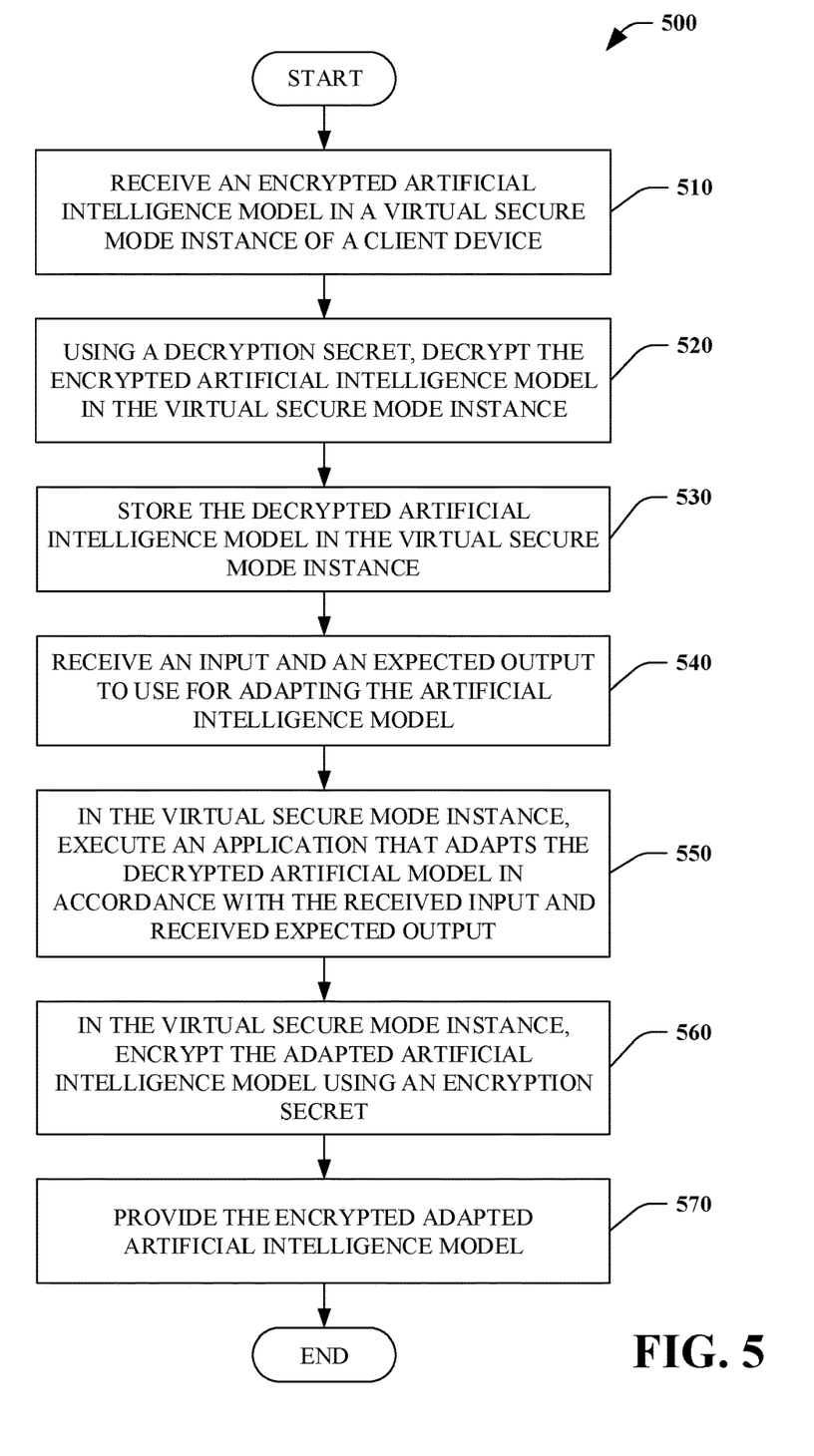
FIG. 5 is a flow chart of another method of protecting an artificial intelligence model on a client device.

FIGS. 3-5 illustrate exemplary methodologies relating to protecting an artificial intelligence (AI) model on a client device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 3, a method of protecting an artificial intelligence (AI) model on a client device 300 is illustrated. In some embodiments, the method 300 is performed by the system 100.

At 310, an encrypted artificial model is received in a virtual secure mode instance of a client device. At 320, in the virtual secure mode instance, the encrypted artificial intelligence model is decrypted using a decryption secret.

At 330, the decrypted artificial intelligence model is stored in the virtual secure mode instance. At 340, an application that utilizes the decrypted artificial intelligence model is executed in the virtual secure mode instance.

Turning to FIG. 4, a method of protecting an artificial intelligence (AI) model on a client device 400 is illustrated. In some embodiments, the method 400 is performed by the system 100.

At 410, an encrypted artificial model is received in a virtual secure mode instance of a client device. At 420, in the virtual secure mode instance, the encrypted artificial intelligence model is decrypted using a decryption secret.

At 430, the decrypted artificial intelligence model is stored in the virtual secure mode instance. At 440, an input is received, for example, from an application executing on a host operating system. At 450, in the virtual secure mode instance, an application is executed that utilizes the decrypted artificial intelligence model to infer an output based upon the received input. At 460, the inferred output is provided, for example, to the application executing on the host operation system.

Referring to FIG. 5, a method of protecting an artificial intelligence (AI) model on a client device 500 is illustrated. In some embodiments, the method 500 is performed by the system 100.

At 510, an encrypted artificial model is received in a virtual secure mode instance of a client device. At 520, in the virtual secure mode instance, the encrypted artificial intelligence model is decrypted using a decryption secret.

At 530, the decrypted artificial intelligence model is stored in the virtual secure mode instance. At 540, an input and an expected output to use for adapting the artificial intelligence model are received. At 550, in the virtual secure mode instance, an application is executed that adapts the decrypted artificial intelligence model in accordance with the received input and received expected output.

At 560, in the virtual secure mode instance, the adapted artificial intelligence model is encrypted using an encryption secret. At 570, the encrypted adapted artificial intelligence model is provided. In some embodiments, the encrypted artificial intelligence model is provided to a host operating system, for example, for transmission to a cloud-based service that aggregates a plurality of instances of the artificial intelligence model. The aggregated artificial intelligence model can then be encrypted and redeployed to client device(s). In some embodiments, the encrypted artificial intelligence model can be transmitted directly from the virtual secure mode instance, for example, to the cloud-based service.

Described herein is a system for protecting an artificial intelligence model, comprising: a client device comprising a processor and a memory having computer-executable instructions stored thereupon which, when executed by the processor, cause the client device to: receive an encrypted artificial intelligence model in a virtual secure mode instance of the client device; decrypt the encrypted artificial intelligence model in the virtual secure mode instance using a decryption secret; store the decrypted artificial intelligence model in the virtual secure mode instance; and execute an application that utilizes the decrypted artificial intelligence model in the virtual secure mode instance.

The system can further include the memory having further computer-executable instructions stored thereupon which, when executed by the processor, cause the processing system to: receive an input and an expected output by the application in the virtual secure mode instance, wherein executing the application in the virtual secure mode comprises adapting the decrypted artificial intelligence model in accordance with the received input and the expected output. The system can further include the memory having further computer-executable instructions stored thereupon which, when executed by the processor, cause the processing system to: encrypt the adapted artificial intelligence model using an encryption secret in the virtual secure model instance; and provide the encrypted adapted artificial intelligence model.

The system can further include wherein the encryption secret and the decryption secret are different from each other. The system can further include wherein the encryption secret and the decryption secret are the same. The system can further include the memory having further computer-executable instructions stored thereupon which, when executed by the processor, cause the processing system to: receive an input by the application in the virtual secure mode instance, wherein executing the application in the virtual secure mode comprises inferring an output using the decrypted artificial intelligence model in accordance with the received input; and provide the inferred output. The system can further include wherein a host operating system of the client device cannot access memory of the virtual secure mode instance.

The system can further include wherein the artificial intelligence model is a serialized format of a computation graph in accordance with the Open Neural Network Exchange standard. The system can further include wherein the decryption secret is pre-provisioned into the virtual secure mode instance by a developer of the artificial intelligence model. The system can further include wherein a hypervisor of the client device abstracts a host operating system of client device and the virtual secure mode instance from hardware of the client device.

Described herein is a method protecting an artificial intelligence model on a client device, comprising: receiving an encrypted artificial intelligence model in a virtual secure mode instance of the client device; decrypting the encrypted artificial intelligence model in the virtual secure mode instance using a decryption secret; storing the decrypted artificial intelligence model in the virtual secure mode instance; and executing an application that utilizes the decrypted artificial intelligence model in the virtual secure mode instance.

The method can further include receiving an input and an expected output by the application in the virtual secure mode instance, wherein executing the application in the virtual secure mode comprises adapting the decrypted artificial intelligence model in accordance with the received input and the expected output. The method can further include encrypting the adapted artificial intelligence model using an encryption secret in the virtual secure model instance; and providing the encrypted adapted artificial intelligence model.

The method can further include wherein the encryption secret and the decryption secret are different from each other. The method can further include receiving an input by the application in the virtual secure mode instance, wherein executing the application in the virtual secure mode comprises inferring an output using the decrypted artificial intelligence model in accordance with the received input; and providing the inferred output. The method can further include wherein a host operating system of the client device cannot access memory of the virtual secure mode instance.

Described herein is a computer storage media storing computer-readable instructions that when executed cause a computing device to: receive an encrypted artificial intelligence model in a virtual secure mode instance of the client device; decrypt the encrypted artificial intelligence model in the virtual secure mode instance using a decryption secret; store the decrypted artificial intelligence model in the virtual secure mode instance; and execute an application that utilizes the decrypted artificial intelligence model in the virtual secure mode instance.

The computer storage media can include storing further computer-readable instructions that when executed cause a computing device to: receive an input and an expected output by the application in the virtual secure mode instance, wherein executing the application in the virtual secure mode comprises adapting the decrypted artificial intelligence model in accordance with the received input and the expected output. The computer storage media can include storing further computer-readable instructions that when executed cause a computing device to: encrypt the adapted artificial intelligence model using an encryption secret in the virtual secure model instance; and provide the encrypted adapted artificial intelligence model. The computer storage media can include storing further computer-readable instructions that when executed cause a computing device to: receive an input by the application in the virtual secure mode instance, wherein executing the application in the virtual secure mode comprises inferring an output using the decrypted artificial intelligence model in accordance with the received input; and provide the inferred output.

Figure 6:
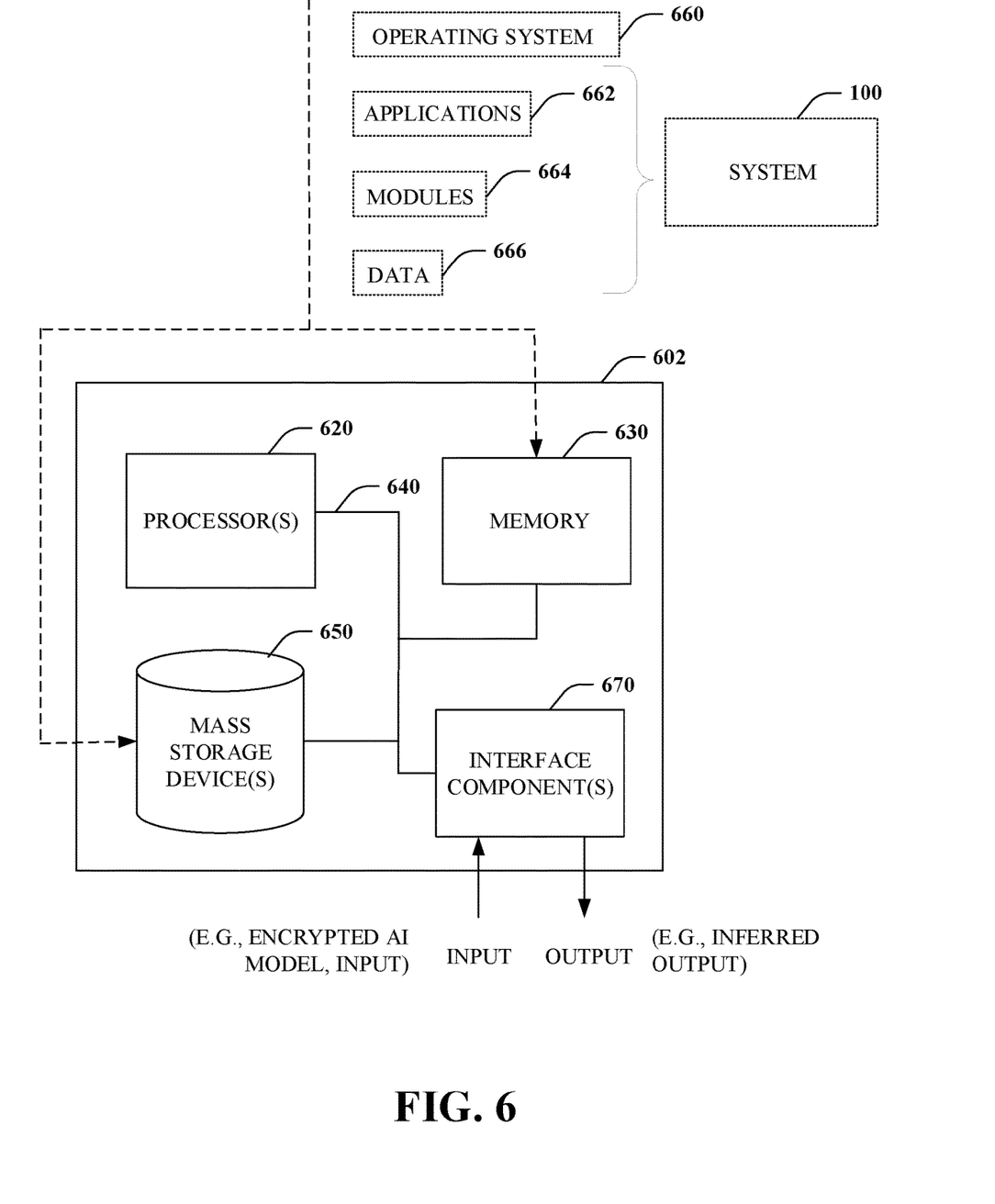
FIG. 6 is a functional block diagram that illustrates an exemplary computing system.

With reference to FIG. 6, illustrated is an example general-purpose computer, processing system, or computing device 602 (e.g., mobile phone, desktop, laptop, tablet, watch, server, hand-held, programmable consumer or industrial electronics, set-top box, game system, compute node, etc.). For instance, the computing device 602 may be used in a system for protecting an artificial intelligence (AI) model on a client device 100.

The computer 602 includes one or more processor(s) 620, memory 630, system bus 640, mass storage device(s) 650, and one or more interface components 670. The system bus 640 communicatively couples at least the above system constituents. However, it is to be appreciated that in its simplest form the computer 602 can include one or more processors 620 coupled to memory 630 that execute various computer executable actions, instructions, and or components stored in memory 630. The instructions may be, for instance, instructions for implementing functionality described as being carried out by one or more components discussed above or instructions for implementing one or more of the methods described above.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 620 can be a graphics processor.

The computer 602 can include or otherwise interact with a variety of computer-readable media to facilitate control of the computer 602 to implement one or more aspects of the claimed subject matter. The computer-readable media can be any available media that can be accessed by the computer 602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 602. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 630 and mass storage device(s) 650 are examples of computer-readable storage media. Depending on the exact configuration and type of computing device, memory 630 may be volatile (e.g., RAM), non-volatile (e.g., ROM, flash memory, etc.) or some combination of the two. By way of example, the basic input/output system (BIOS), including basic routines to transfer information between elements within the computer 602, such as during start-up, can be stored in nonvolatile memory, while volatile memory can act as external cache memory to facilitate processing by the processor(s) 620, among other things.

Mass storage device(s) 650 includes removable/non-removable, volatile/non-volatile computer storage media for storage of large amounts of data relative to the memory 630. For example, mass storage device(s) 650 includes, but not limited to, one or more devices such as a magnetic or optical disk drive, floppy disk drive, flash memory, solid-state drive, or memory stick.

Memory 630 and mass storage device(s) 650 can include, or have stored therein, operating system 660, one or more applications 662, one or more program modules 664, and data 666. The operating system 660 acts to control and allocate resources of the computer 602. Applications 662 include one or both of system and application software and can exploit management of resources by the operating system 660 through program modules 664 and data 666 stored in memory 630 and/or mass storage device (s) 650 to perform one or more actions. Accordingly, applications 662 can turn a general-purpose computer 602 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 662, and include one or more modules 664 and data 666 stored in memory and/or mass storage device(s) 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 602 also includes one or more interface components 670 that are communicatively coupled to the system bus 640 and facilitate interaction with the computer 602. By way of example, the interface component 670 can be a port (e.g., serial, parallel, PCMCIA, USB, FireWire, etc.) or an interface card (e.g., sound, video, etc.) or the like. In one example implementation, the interface component 670 can be embodied as a user input/output interface to enable a user to enter commands and information into the computer 602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 670 can be embodied as an output peripheral interface to supply output to displays (e.g., LCD, LED, plasma, etc.), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art

What is claimed is:

1. A a client device comprising:
   a processor; and
   a memory having computer-executable instructions stored thereupon which, when executed by the processor, cause the client device to:
   receive an encrypted artificial intelligence model;
   using a decryption secret, decrypt the encrypted artificial intelligence model in a virtual secure mode instance;
   store the decrypted artificial intelligence model in the virtual secure mode instance;
   in the virtual secure mode instance, execute a first application operable to utilize the decrypted artificial intelligence model to obtain an output; and
   provide the output obtained by the first application in the virtual secure mode instance on the client device to a second application on the client device that is outside of the virtual secure mode instance.

2. The client device of claim 1, the memory having further computer-executable instructions stored thereupon which, when executed by the processor, cause the client device to:
   receive, by the first application in the virtual secure mode instance, an input and an expected output, wherein executing the first application in the virtual secure mode instance comprises adapting the decrypted artificial intelligence model in accordance with the input and the expected output.

3. The client device of claim 2, the memory having further computer-executable instructions stored thereupon which, when executed by the processor, cause the client device to:
   in the virtual secure mode instance, encrypt the adapted artificial intelligence model using an encryption secret; and
   provide the encrypted adapted artificial intelligence model to a host operating system on the client device that is outside of the virtual secure mode instance.

4. The client device of claim 3, wherein the encryption secret and the decryption secret are different from each other.

5. The client device of claim 3, wherein the encryption secret and the decryption secret are the same.

6. The client device of claim 1, the memory having further computer-executable instructions stored thereupon which, when executed by the processor, cause the client device to:
   receive an input in the virtual secure mode instance; and
   infer the output using the decrypted artificial intelligence model in accordance with the input.

7. The client device of claim 1, wherein the second application is configured to execute on a host operating system of the client device that cannot access memory of the virtual secure mode instance.

8. The client device of claim 1, wherein the artificial intelligence model is a serialized format of a computation graph in accordance with the Open Neural Network Exchange standard.

9. The client device of claim 1, wherein the decryption secret is pre-provisioned into the virtual secure mode instance by a developer of the artificial intelligence model.

10. The client device of claim 1, wherein a hypervisor of the client device abstracts a host operating system of client device and the virtual secure mode instance from hardware of the client device.

11. A method performed on a client device, the method comprising:
    receiving an encrypted artificial intelligence model at the client device;
    using a decryption secret, decrypting the encrypted artificial intelligence model in a virtual secure mode instance on the client device;
    storing the decrypted artificial intelligence model in the virtual secure mode instance;
    in the virtual secure mode instance, executing a first application operable to utilize the decrypted artificial intelligence model to obtain an output; and
    providing the output obtained by the first application in the virtual secure mode instance on the client device to a second application on the client device that is outside of the virtual secure mode instance.

12. The method of claim 11, further comprising:
    receiving, by the first application in the virtual secure mode instance, an input and an expected output, wherein executing the first application in the virtual secure mode instance comprises adapting the decrypted artificial intelligence model in accordance with the input and the expected output.

13. The method of claim 12, further comprising:
    encrypting the adapted artificial intelligence model using an encryption secret in the virtual secure mode instance; and
    providing the encrypted adapted artificial intelligence model to a host operating system on the client device that is outside of the virtual secure mode instance.

14. The method of claim 13, wherein the encryption secret and the decryption secret are different from each other.

15. The method of claim 11, further comprising:
    receiving an input in the virtual secure mode instance, wherein executing the first application in the virtual secure mode instance comprises inferring the output using the decrypted artificial intelligence model in accordance with the input.

16. The method of claim 11, wherein the second application is configured to execute on a host operating system of the client device, the virtual secure mode instance comprises a sequestered process, and the host operating system cannot access memory of the sequestered process.

17. A computer storage media storing computer-readable instructions that, when executed, cause a computing device to:
    receive an encrypted artificial intelligence model at a client device;
    decrypt the encrypted artificial intelligence model in a virtual secure mode instance on the client device using a decryption secret;
    store the decrypted artificial intelligence model in the virtual secure mode instance;
    in the virtual secure mode instance, execute a first application operable to utilize the decrypted artificial intelligence model to obtain an output; and
    provide the output obtained by the first application on the client device in the virtual secure mode instance to a second application on the client device that is outside of the virtual secure mode instance.

18. The computer storage media of claim 17 storing further computer-readable instructions that, when executed, cause the computing device to:
    receive, by the first application in the virtual secure mode instance, an input and an expected output, wherein executing the first application in the virtual secure mode instance comprises adapting the decrypted artificial intelligence model in accordance with the input and the expected output.

19. The computer storage media of claim 18 storing further computer-readable instructions that, when executed, cause the computing device to:
    encrypt the adapted artificial intelligence model using an encryption secret in the virtual secure mode instance; and
    provide the encrypted adapted artificial intelligence model to a host operating system on the client device that is outside of the virtual secure mode instance.

20. The computer storage media of claim 17 storing further computer-readable instructions that, when executed, cause the computing device to:
    receive an input in the virtual secure mode instance; and
    infer the output using the decrypted artificial intelligence model in accordance with the input.

* * * * *